Figures 1, 2:
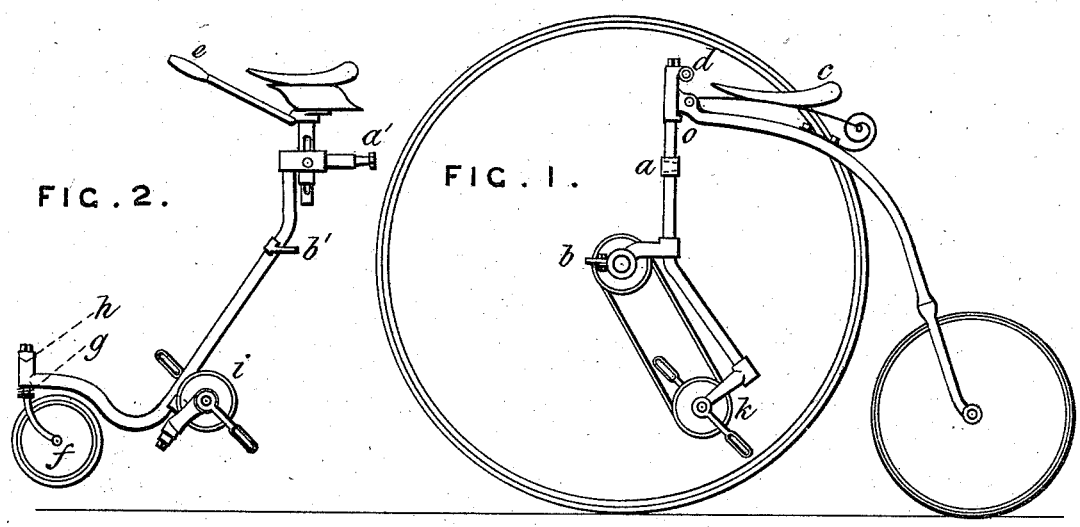

(No Model.) 3 Sheets—Sheet 1.

T. HUMBER.
VELOCIPEDE.

No. 305,690. Patented Sept. 23, 1884.

Witnesses. Inventor.
Jo. L. Coombs Thomas Humber.
Robert Everett By James L. Norris.
Atty.

(No Model.) 3 Sheets—Sheet 2.

T. HUMBER.
VELOCIPEDE.

No. 305,690. Patented Sept. 23, 1884.

Witnesses
Jo. L. Coombs
Robert Everett

Inventor
Thomas Humber,
By James L. Norris,
Atty.

(No Model.) 3 Sheets—Sheet 3.
T. HUMBER.
VELOCIPEDE.
No. 305,690. Patented Sept. 23, 1884.
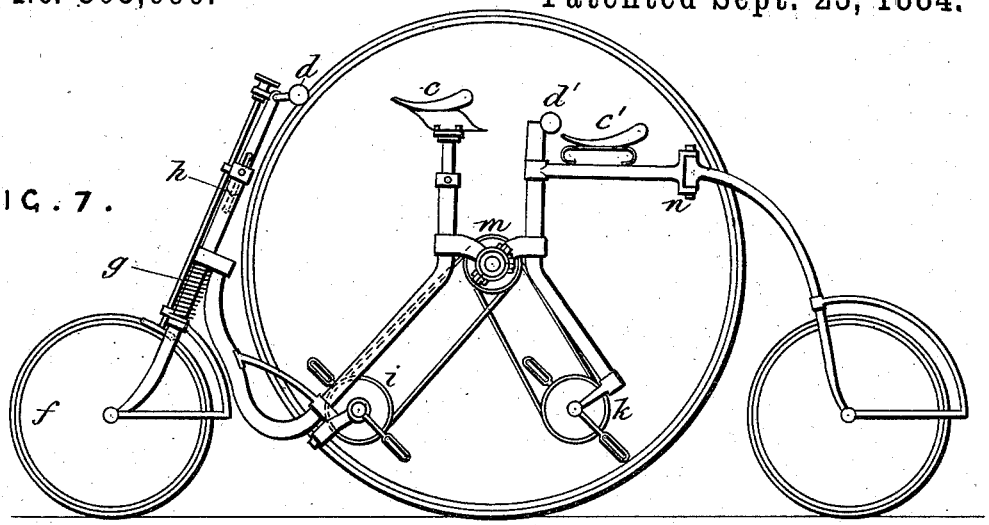
FIG. 7.
FIG. 8. FIG. 9.
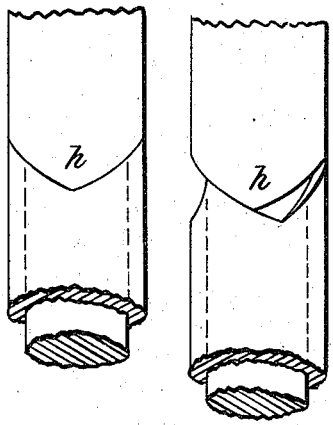
FIG. 10.
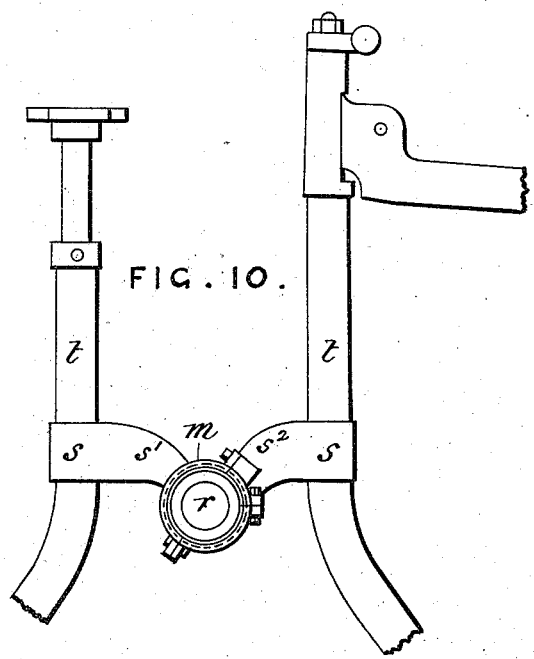
FIG. 11.
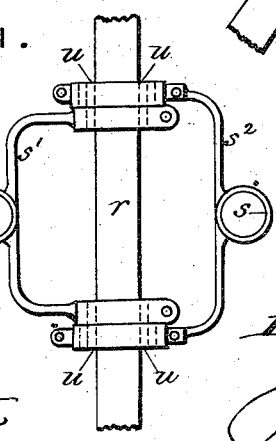
Witnesses.
Jo. L. Coombs
Robert Everett
Inventor.
Thomas Humber.
By James L. Norris.
Atty.

UNITED STATES PATENT OFFICE.

THOMAS HUMBER, OF QUEENS ROAD, BEESTON, COUNTY OF NOTTINGHAM, ENGLAND.

VELOCIPEDE.

SPECIFICATION forming part of Letters Patent No. 305,690, dated September 23, 1884.

Application filed May 26, 1884. (No model.) Patented in England November 30, 1883, No. 5,583.

*To all whom it may concern:*

Be it known that I, THOMAS HUMBER, a subject of the Queen of Great Britian, residing at Queens Road, Beeston, in the county of Nottingham, England, manufacturer, have invented certain new and useful Improvements in Velocipedes, (for which I have obtained a patent in Great Britain, No. 5,583, bearing date 30th November, 1883,) of which the following is a specification.

This invention relates more especially, though not exclusively, to that form of tricycle which is known as the "Humber;" and the object of my invention is to make such modifications and additions to that and analogous tricycles as to render them capable of accommodating two or more persons without the necessity of increasing the width for that purpose.

In carrying out one form of my invention, I attach a suitable frame-work to the front part of the tricycle, to which an extra seat or seats and pedals are fixed, and to the lower part of which a small wheel is attached, which wheel is usually about two inches above the ground, but is so placed to prevent the tricycle from overbalancing longitudinally. This arrangement transforms the tricycle into a tandem "sociable." The steering in this arrangement is effected by means of the head known as the "Stanley" head, by which the rear rider has complete control in steering and applying the brake power; and my invention also consists in applying the Stanley head form of steering with a long backbone and with spring and saddle attached for the extra rider to any front or rear steering tricycle, thus embodying a combination of the two machines. In arranging the driving-gear I affix two wheels on the driving-axle and connect the same with the two pedal-axles by means of steel chains, thus forming one continuous central combination of driving-gear.

In applying my invention to front-steering tricycles, I fix a spring to the front steering-wheel. I usually steer by means of a rod or tube fixed in a diagonal line, in which case I fix an annular cam, which by its action tends to keep the steering-wheel in a straight line without the use of the hands, such steering being effected without using either rack or pinion or chain or cord; but in some cases I use such appliances to the steering-wheel. In this form of my invention there are four wheels on the ground, and therefore I add an extra joint, to allow of vertical action on uneven ground, and which joint is so placed as to allow vertical play to either the front or back wheel, in order that all four wheels may at all times fairly rest on the ground; and in order that my said invention may be clearly understood reference is hereby made to the accompanying drawings, in which similar letters of reference indicate corresponding parts in the several figures.

Figure 3:
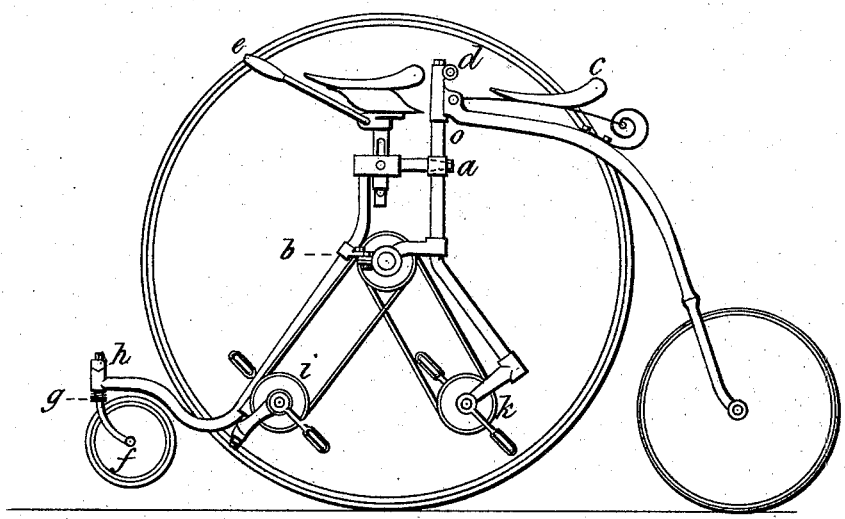
Figures 4, 5:
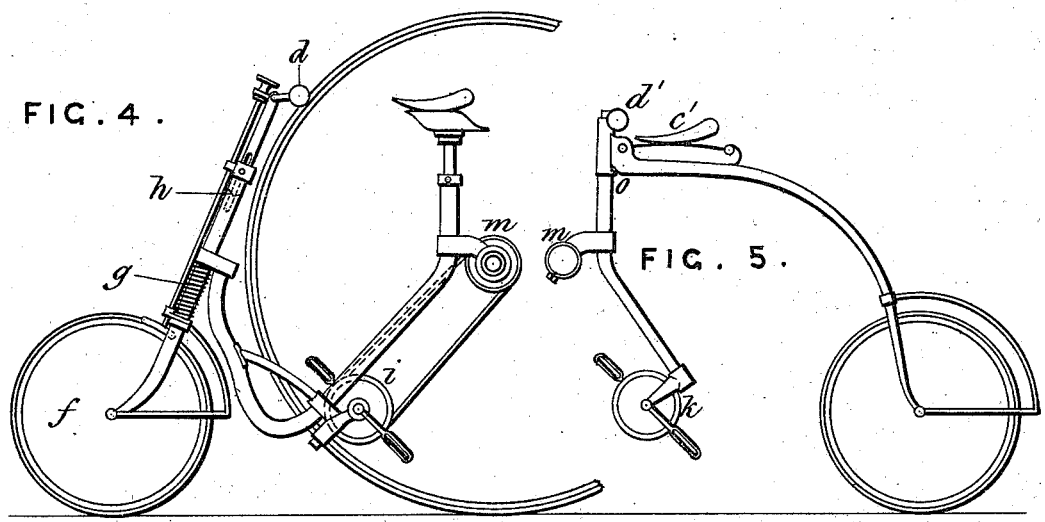
Figure 6:
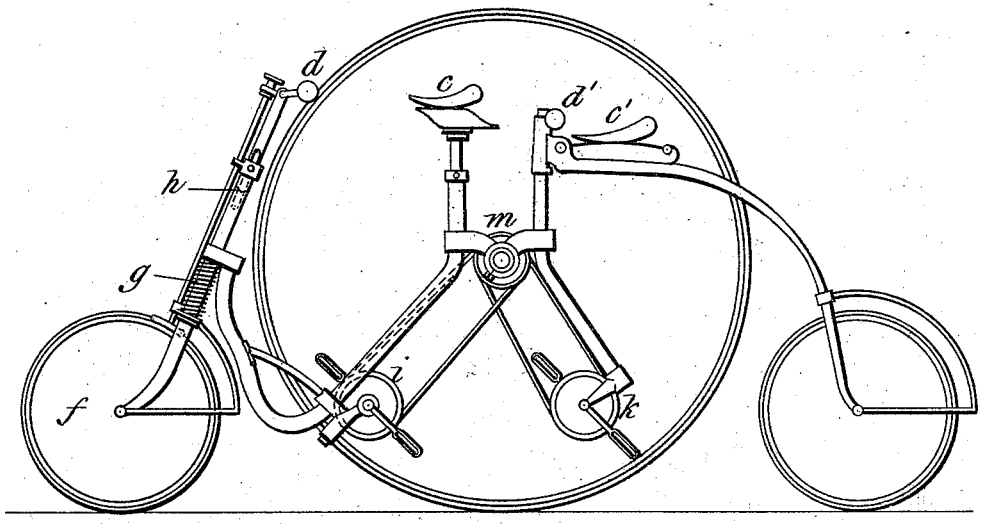

Figure 1 is an elevation of the tricycle known as the "Humber." Fig. 2 is an elevation of the additional frame and wheel shown detached. Fig. 3 is an elevation showing the combination of Figs. 1 and 2, whereby the Humber in Fig. 1 is converted into a tandem sociable, in which it will be seen to be still a tricycle as, although it has four wheels, three only are bearers. The hind wheel is the steering-wheel. Fig. 4 is an elevation of a front steering tricycle, and Fig. 5 is an elevation of the additional portion detached, which is designed to convert the front steerer into a tandem sociable velocipede. Fig. 6 is an elevation of the latter combination, the front wheel being the steering-wheel. The hind wheel is so fitted as to be free to follow the course steered. In Fig. 7 a slight variation is shown, the long backbone being divided at $n$, where the joint for horizontal play is formed, instead of such play taking place at $o$, as in the other figures.

The tricycle shown in Figs. 1 and 3 is fitted with a block, $a$, and bolt $a'$, and attachments $b$ and $b'$ for connecting the frame shown in Fig. 2 to the tricycle, Fig. 1. The rear rider on the seat $c$ has the control of the steering-handle $d$. The handles $e$ are for the front rider to use as a support for the hands and to steady himself. The front wheel, $f$, is kept a little above the ground, and is intended as a safeguard against overbalancing. This wheel is provided with a spring, $g$, and annular cam $h$. The wheel $f$ is thereby kept in a straight line, but is capable of momentarily locking on taking the ground, and immediately after leaving the ground the wheel resumes a straight line from the prompt action of the spring and cam. The two riders drive the two crank-axles $i$ $k$, and these simultaneously actuate the main axle by means of belts, chains, or straps. The rear rider has complete control of the steering and the application of the brake.

Fig. 4 represents a front-steering tricycle, with my improved direct steering rod or tube, which is placed diagonally, as shown. This steering-rod is fitted with a spring, $g$, and annular cam $h$, which operate in such a manner as to tend to keep the steering-wheel in a straight line. The separate frame shown in Fig. 5 is made to fit this tricycle, and Fig. 6 shows the combination which transforms the front-steering tricycle into a tandem sociable, with four wheels bearing on the ground. In this form of my invention, I make a joint, $a$ $m$, which allows the hind wheel to rise and fall to accommodate the wheels to any unevenness of the ground.

I am aware that it is not new to provide for the rise and fall of the hind wheel, and I do not seek to claim all methods of providing for such rise and fall. My improved joint is shown in Figs. 4, 5, 6, and 7, and on an enlarged scale in Figs. 10 and 11, in which latter figures $r$ is the axle. $s\ s$ are sockets in which the standards $t\ t$ are secured. $s'$ is the front bracket, which has short sleeves at $u\ u$, upon which sleeves the bracket $s^2$ is secured, and upon which center the vertical motion of the bracket $s^2$ takes place.

In Fig. 7 the lateral play of the hind wheel is provided for at $n$, the long backbone being divided as shown. In the previous figures this lateral play takes place at $o$.

Fig. 8 is an enlarged view of the cam $h$, and Fig. 9 explains its operation.

The arrangement of the spring $g$ and annular cam $h$ is capable of application in an obvious manner to the third wheels of other tricycles now commonly in use, whether such wheels are steering-wheels or only supporting-wheels, and will be found to be a very useful adjunct to such machines.

Having now particularly described and ascertained the nature of my said invention and in what manner the same is to be performed, I declare that what I claim is—

1. The combination of a framing or backbone, a saddle supported thereon at one end, a wheel at the other end thereof, a pulley, a set of pedals upon a shaft thereof, and means, as described, for readily attaching the same to a tricycle, the whole forming a complete organism for attachment to a tricycle without alteration or change of the latter, whereby the same may be readily converted into a double-seated tandem velocipede, substantially as described.

2. In a removable frame-work for three or more wheeled velocipedes, the combination, with the extra wheel and its supports, of the spring $g$ and cam $h$, substantially as described.

3. The combination, in a three or more wheeled velocipede, of two frame-works, each carrying a seat or saddle, pedals, and a driving-pulley and brackets, one for each framework, one bracket being journaled on the main shaft, while the other bracket is journaled on shoulders on the first bracket, substantially as described.

4. The combination, in a three or more wheeled velocipede, of the standards $t\ t$, bracket $s'$, having shoulders $u\ u$, and journaled on main shaft $r$, and bracket $s^2$, journaled on the shoulders $u\ u$, substantially as described.

5. In a three or more wheeled velocipede, having two or more frame-works, and adapted for two riders, tandem, a backbone divided and jointed to permit lateral movement of the non-steering wheel, substantially as described.

In testimony whereof I have hereto set my hand this 29th day of April, 1884.

THOMAS HUMBER.

Witnesses:
   JAMES I. HORN,
     6 *Ossington Villas, Nottingham.*
   WALTER R. PENDLETON,
     *High St., Beeston, Notts.*